(No Model.) 2 Sheets—Sheet 1.
H. H. WALSH.
BRICK DRIER.
No. 588,621. Patented Aug. 24, 1897.
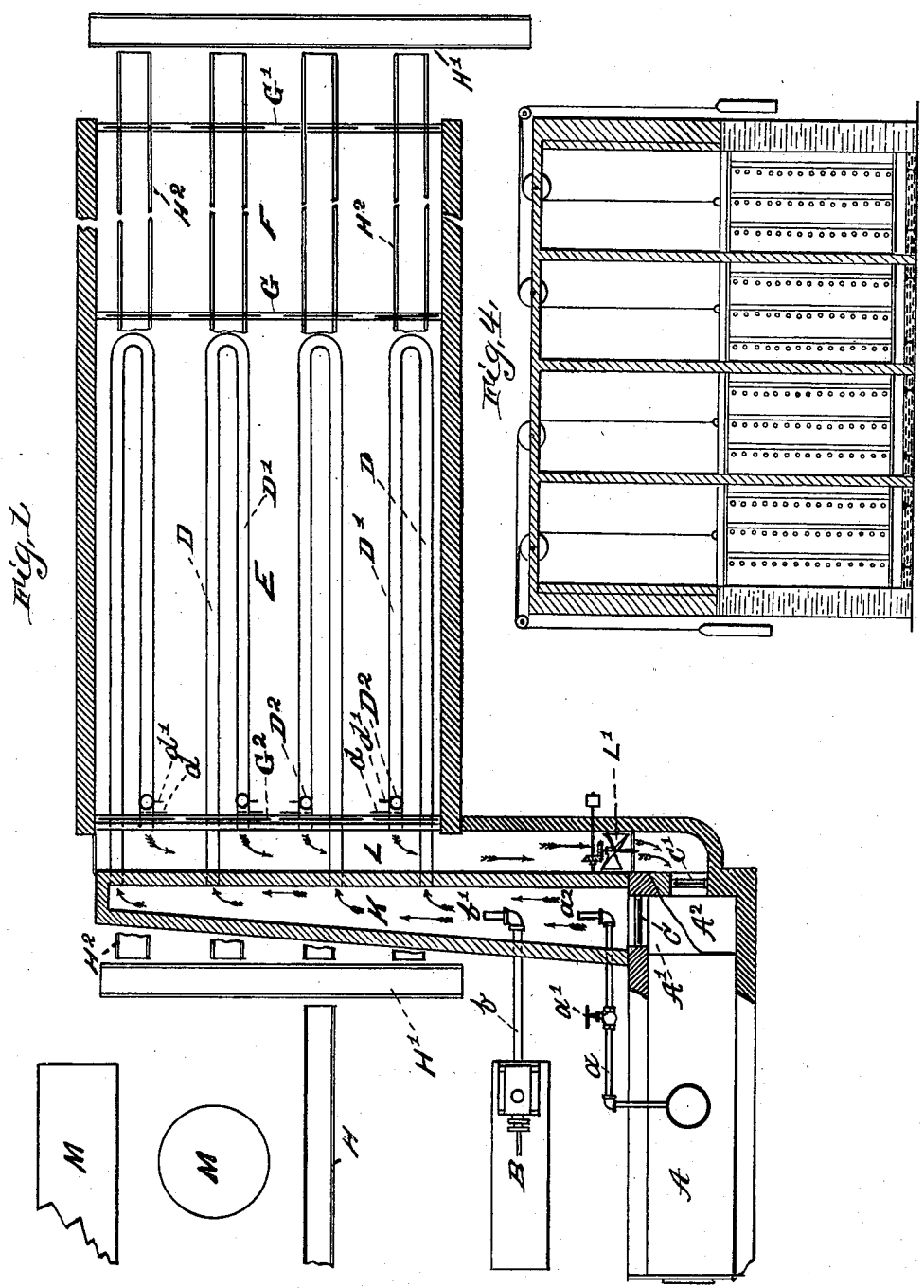
WITNESSES:
INVENTOR.
Hiram H. Walsh
BY John F. Kerr
ATTORNEY.

(No Model.) 2 Sheets—Sheet 2.
H. H. WALSH.
BRICK DRIER.
No. 588,621. Patented Aug. 24, 1897.
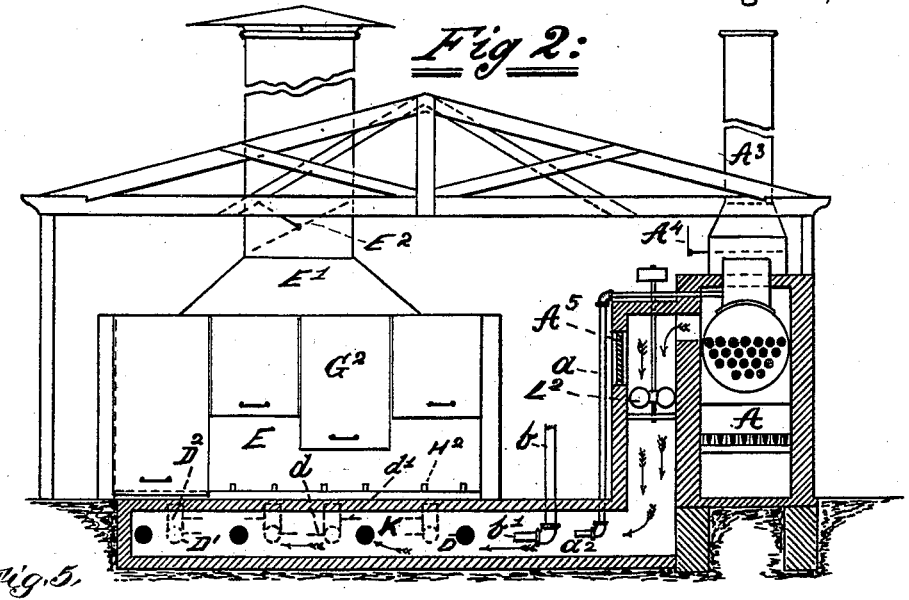
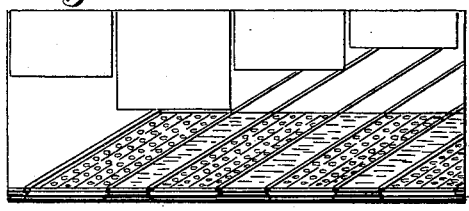
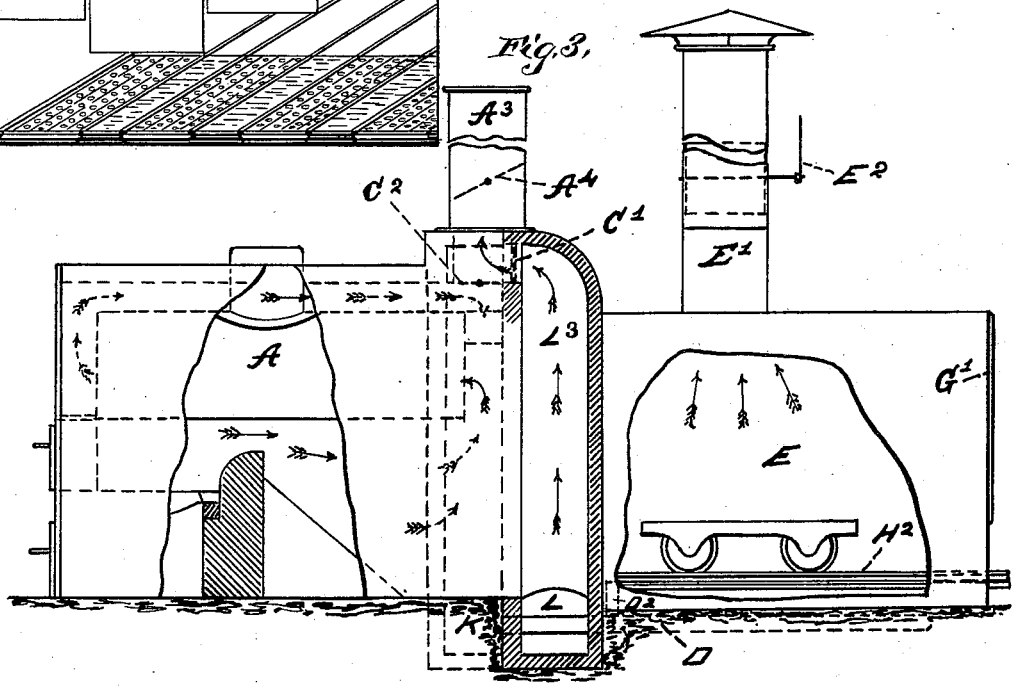
WITNESSES:
Richard A. Haly
Wm M. Drew
INVENTOR.
Hiram H Walsh
BY John F. Kerr
ATTORNEY.

UNITED STATES PATENT OFFICE.

HIRAM H. WALSH, OF PASSAIC, NEW JERSEY.

BRICK-DRIER.

SPECIFICATION forming part of Letters Patent No. 588,621, dated August 24, 1897.

Application filed August 18, 1896. Serial No. 603,156. (No model.)

*To all whom it may concern:*

Be it known that I, HIRAM H. WALSH, of the city of Passaic, county of Passaic, and State of New Jersey, have invented certain new and useful Improvements in Methods or Processes of Drying Brick, Tile, and Lumber, of which the following is a specification.

The object of my invention is to provide a new and useful method or process for drying and heating purposes, but especially for drying brick, tile, lumber, &c, which will enable those engaged in the trade or manufacture of brick to increase the output with a great saving, both as to cost of the plant, the space required for building it, and the running expenses thereof.

The invention consists of the process or method illustrated in the accompanying drawings, which form a part of this specification— viz., the heating or drying by means of heat radiated from conduits containing commingled steam and waste heat. When the plant is in operation in the daytime, the exhaust-steam from the engine and the waste heat from the boiler are commingled and forced through the conduits, and at night, or when the engine is not running, the waste heat from the boiler passes through said conduits and steam is blown from a jet into and commingled with the waste heat and passes through said conduits, returning to the stack of the boiler. The kiln in which the bricks are dried is provided with a ventilator-stack and doors for the admission and exit of air. The green brick is passed in one end of the drier on cars and is taken out of the opposite end thereof dry. The drying-chamber may be from one hundred to one hundred and fifty feet long, and the bricks may be dried and cooled while in the chamber, the cars being passed through the chamber slowly, and as one passes out at one end another car will enter at the ingress. The temperature in the drier may be regulated with facility and the defects that are frequently caused by passing the bricks out into the open air while hot are obviated. By introducing steam into the conduits and mixing it with the waste heat passing through them condensation is obviated to the greatest possible degree. As is obvious, a great saving is effected by utilizing the exhaust-steam and the surplus or waste heat from the boiler.

In the accompanying drawings, in which similar letters of reference indicate like parts, is shown a brick drier or kiln which is constructed to perform or carry out the method or process claimed by me, although other constructions might be suggested to suit my process.

Figure 1 is a plan view showing the location of the brick-machine, the turn-table, tracks to the kiln or drier, and the arrangement of the boiler, engine, kiln, radiation-conduits, waste-heat chamber, the steam-jet, and the course of the waste heat and steam in passing through the conduits, and also the blower or fan to draw and propel the same through the conduits and back to the boiler-stack. Fig. 2 is a front elevation of the same, showing the boiler-stack and ventilator, the exhaust-steam pipe and the direct-steam jet entering the hot-air chamber or conducting-flue K, and a blower or fan to force the waste heat and steam through the radiation-conduits and out into the chamber or flue L to chimney. Fig. 3 is a longitudinal elevation, part sectional, showing dampers in stack and flue and how the waste heat is utilized and the course of the commingled waste heat and steam until discharged through the smokestack or boiler-stack and how the temperature of the drying-chamber is ventilated by means of the ventilator. Fig. 4 is a rear elevation.

In the drawings, A is the boiler; A', the waste-heat flue from boiler-flues to conduits; $A^2$, the waste-heat flue from conduits to chimney.

$A^3$ is the chimney-stack, which is provided with the damper $A^4$ to regulate the draft in getting up steam.

$A^5$ is a regulating-valve to admit cold air when desired.

B represents the engine. The flue A' is provided with a damper C, and the flue $L^3$ has the damper C'. A damper $C^2$ is provided to turn the waste heat to the flue K. A waste-heat flue D is shown in the kiln and a return-flue D'. $D^2$ is an outlet in same opening into the kiln E.

The kiln has a ventilator or escape-chimney E' for vapor, which is provided with a damper $E^2$.

The discharging end of the drier is shown at F, and G' and $G^2$ are shutter-doors to kiln.

Cars are loaded on the tracks H and pass over transfer-tracks H' to tracks H² into the kiln.

The waste heat and steam commingle and pass through the flue K to the flues D and return-flue D' to flue L and are sucked or pushed by exhaust-fan L' and pressure-fan L² through the vertical flue to the chimney A³.

The brick-making machine and turn-table are represented by M M.

A steam-pipe $a$, leading from the boiler A, provided with a controlling-valve $a'$, terminates with the steam-jet $a^2$ in the flue K, whereby a direct jet of steam is blown into the flue K and mixes with the waste heat therein, and an exhaust-pipe $b$ from the engine terminates in an exhaust-steam jet $b'$ in the flue K, whereby the exhaust-steam is utilized.

The outlet pipes or flues D' are provided with a damper $d$ and the rising pipe D² with the damper $d'$, which when occasion demands may be used to send the draft up the ventilator-stack or create a draft in the drier.

Doors at discharging end of drier, as well as the doors at the entering end, are provided with ventilators, which admit cool air to pass through the brick already dry and chill the air in the receiving end to reduce the heat and prevent the brick from checking. The cool air passes through the brick, and it is gradually cooled before it is removed from the drier, which insures a sounder brick and permits me to utilize the heat that is in the brick until it is all extracted and the bricks become cool, when they are taken from the drier.

The arrows in the drawings indicate the course of the waste heat and steam from the flue K, in which they are commingled, to the conduits in the drier, and thence back again to the flue L and to the chimney-stack.

The waste heat passes through the flues in the boiler A and over the shell to the flue K. The waste heat and steam commingling and flowing on together mutually assist in keeping up the temperature of the whole, the dry waste heat and the moist steam heat mutually affecting each other and tempering the character of the heat. Either one or both of the fans L' L² may be employed, but the exhaust-fan L' will alone ordinarily serve to accomplish the result desired. When it is necessary to utilize the waste heat that would otherwise pass up the chimney, the damper C² is closed and the waste heat will then pass to the flue K instead of up the chimney. It will then pass through the conduits in the drier and return to the flue L, and thence through the open damper C' to the chimney and be discharged.

The brick having been molded or cut my process of drying is as follows: The bricks are put on pallets or hacked on cars, with spaces between for the air to pass through and around them. A current of waste heat is started through the conduits in the drier and steam is forced into the current of waste heat and mingled therewith until the temperature of the air in the drying-chamber is moderately increased by the heat radiated from the said conduits, through which the commingled steam and waste heat are passing to the stack of the boiler. The cars loaded with brick are then run into the drying-chamber above the said conduits, and the temperature of the drying-chamber is then increased as desired by regulating the flow of the currents of steam and waste heat through the conduits. The brick is kept in said drying-chamber and submitted to the temperature thereof until dry and cool, when it is discharged therefrom. A draft is caused through the drier by ventilators in the doors at the discharging end and under the doors at the receiving end thereof to draw the steam and vapor arising from the moist bricks up through the ventilator-stack and to cause the heat waves to pass up and around through the bricks. The draft of cool air from the ventilators in the doors at the discharging end of drier cools the bricks gradually as they approach said doors. The heat from said bricks approaching said doors obviously heats said cool air and comes in and it is utilized for drying purposes on its way through the drier to the ventilator-stack. The draft of cool air entering the drying-chamber through the ventilators under the doors at the receiving end causes the heat to be less intense at the receiving end of the drying-chamber than it is farther in, so that the bricks are gradually heated as they pass into the drier and gradually cooled as they pass out at the discharging end.

With this description of my invention, what I claim is—

A drying-kiln having at one end parallel supply and exhaust headers, radiating-pipes adapted to discharge the heating medium either within the kiln or into the exhaust-header, a system of supply pipes and valves whereby either live or exhaust steam or both may be used in connection with products of combustion for heating purposes, a fan in the exhaust-header and damper-controlled passages permitting the waste heat to pass through the heating-pipes or directly up the smoke-stack.

HIRAM H. WALSH.

Witnesses:
JOHN F. KERR,
FELIX G. PETTIT.